United States Patent
Winzer

(10) Patent No.: US 11,567,273 B2
(45) Date of Patent: Jan. 31, 2023

(54) OPTICAL FIBER-TO-CHIP INTERCONNECTION

(71) Applicant: Nubis Communications, Inc., Aberdeen, NJ (US)

(72) Inventor: Peter Johannes Winzer, Aberdeen, NJ (US)

(73) Assignee: Nubis Communications, Inc., Aberdeen, NJ (US)

( * ) Notice: Subject to any disclaimer, the term of this patent is extended or adjusted under 35 U.S.C. 154(b) by 0 days.

(21) Appl. No.: 17/705,775

(22) Filed: Mar. 28, 2022

(65) Prior Publication Data
US 2022/0221662 A1    Jul. 14, 2022

Related U.S. Application Data

(63) Continuation of application No. 16/816,171, filed on Mar. 11, 2020, now Pat. No. 11,287,585.

(51) Int. Cl.
*G02B 6/42* (2006.01)

(52) U.S. Cl.
CPC ......... *G02B 6/4206* (2013.01); *G02B 6/4213* (2013.01)

(58) Field of Classification Search
CPC ............................ G02B 6/4206; G02B 6/4213
See application file for complete search history.

(56) References Cited

U.S. PATENT DOCUMENTS

| | | |
|---|---|---|
| 5,475,489 A | 12/1995 | Gottsche |
| 6,434,291 B1 | 8/2002 | Kessler et al. |
| 6,587,618 B2 | 7/2003 | Raguin et al. |
| 6,910,780 B2 | 6/2005 | Vail et al. |
| 7,025,511 B2 | 4/2006 | Nakajima |
| 7,399,125 B1 | 7/2008 | Whaley et al. |
| 7,505,192 B1 | 3/2009 | Zhao et al. |
| 7,742,566 B2 | 6/2010 | Hopkins et al. |
| 8,047,856 B2 | 11/2011 | McColloch |
| 8,090,230 B1 | 1/2012 | Hasharoni |
| 8,488,921 B2 | 7/2013 | Donay |

(Continued)

FOREIGN PATENT DOCUMENTS

| | | |
|---|---|---|
| EP | 2656137 | 9/2015 |
| WO | WO 2003036335 | 5/2003 |
| WO | WO 2021170200 | 9/2021 |

OTHER PUBLICATIONS

Bernstein, [online] "New IEEE Standard Brings 200 GB/s and 400 GB/s to Data Centers," Dec. 8, 2017, retrieved on Oct. 1, 2021, retrieved from URL<https://blog.leviton.com/new-ieee-standard-brings-200-gbs-and-400-gbs-data-centers>, 2 pages.

(Continued)

*Primary Examiner* — Daniel Petkovsek
(74) *Attorney, Agent, or Firm* — Fish & Richardson P.C.

(57) ABSTRACT

Provided is a connector assembly for optically connecting one or more optical fibers and an array of vertical coupling elements of a photonic integrated circuit (PIC). In various embodiments, the connector assembly is constructed to independently optically scale some feature sizes, such as, for example, the transverse mode size, the array size, the array geometry, and/or various incidence angles, the optical scaling being performed, e.g., from a fiber end face plane to a connector-mating plane and further to a PIC coupling plane. In some embodiments, the connector assembly may support a polarization (de)multiplexing functionality.

30 Claims, 7 Drawing Sheets

(56) References Cited

U.S. PATENT DOCUMENTS

| | | | |
|---|---|---|---|
| 9,170,683 B2 | 10/2015 | Drumm | |
| 9,229,169 B2 | 1/2016 | Doany et al. | |
| 9,366,832 B2 | 6/2016 | Arao et al. | |
| 9,453,723 B1 | 9/2016 | LeMaitre et al. | |
| 9,645,316 B1 | 5/2017 | Hasharoni | |
| 9,927,575 B2 | 3/2018 | Goodwill | |
| 9,971,110 B1 | 5/2018 | Hsu | |
| 10,025,043 B2 | 7/2018 | Vallance | |
| 10,551,575 B2 | 2/2020 | Roth et al. | |
| 11,287,585 B2 | 3/2022 | Winzer | |
| 2002/0145802 A1 | 10/2002 | Osawa | |
| 2004/0033016 A1 | 2/2004 | Kropp et al. | |
| 2004/0047583 A1 | 3/2004 | Chiba et al. | |
| 2004/0051863 A1 | 3/2004 | Tsien et al. | |
| 2006/0239605 A1 | 10/2006 | Palen et al. | |
| 2013/0089293 A1 | 4/2013 | Howard | |
| 2013/0094088 A1 | 4/2013 | Merrill | |
| 2015/0037044 A1 | 2/2015 | Peterson | |
| 2015/0049379 A1 | 2/2015 | Doerr et al. | |
| 2015/0125110 A1 | 5/2015 | Anderson | |
| 2015/0177097 A1 | 6/2015 | Clarke et al. | |
| 2015/0293305 A1 | 10/2015 | Kakagawa | |
| 2016/0109659 A1 | 4/2016 | Jiang | |
| 2016/0209610 A1 | 7/2016 | Kurtz | |
| 2016/0344156 A1 | 11/2016 | Rothberg et al. | |
| 2016/0377821 A1 | 12/2016 | Vallance | |
| 2017/0123164 A1 | 5/2017 | Suematsu | |
| 2017/0139145 A1 | 5/2017 | Heanue | |
| 2017/0146736 A1 | 5/2017 | Versiegers et al. | |
| 2017/0146751 A1 | 5/2017 | Sutherland | |
| 2017/0196459 A1 | 7/2017 | Lam et al. | |
| 2018/0231727 A1 | 8/2018 | Kurtz | |
| 2018/0259730 A1 | 9/2018 | Hochberg et al. | |
| 2018/0288504 A1 | 10/2018 | Yang et al. | |
| 2018/0329159 A1 | 11/2018 | Varghese | |
| 2019/0033528 A1 | 1/2019 | Ootorii | |
| 2019/0064457 A1 | 2/2019 | Roth et al. | |
| 2019/0258175 A1 | 8/2019 | Dietrich | |
| 2019/0312642 A1 | 10/2019 | Neilson | |
| 2020/0158964 A1 | 5/2020 | Winzer et al. | |
| 2020/0158967 A1 | 5/2020 | Winzer et al. | |
| 2021/0286140 A1 | 9/2021 | Winzer | |
| 2022/0291461 A1 | 9/2022 | Elsinger | |

OTHER PUBLICATIONS

Borca et al., "Buried channel waveguides in Yb-doped KY(WO4)2 crystals fabricated by femtosecond laser irradiation," Applied Surface Science, Feb. 27, 2007, 8300-8303.

Budiman et al., "Cross-sectional study of femtosecond laser bulk modification of crystalline α-quartz," Appl. Phys. A, Mar. 2010, 98: 849-853.

Chen et al., "Optical waveguides in crystalline dielectric materials produced by femtosecond-laser micromachining," Laser Photonics Rev., Mar. 2014, 2:251-275.

Chuang et al., "Theoretical and Empirical Qualification of a Mechamcal-Optical Interface for Parallel Optics Links," Photonics West Optical Interconnects XV, Proc. SPIE vol. 9368, article 936825, Apr. 3, 2015, 11 pages.

De Heyen et al., "Ultra-dense 16×56Gb/s NRZ GeSi EAM-PD arrays coupled to multicore fiber for short-reach 896Gb/s optical links," Optical Fiber Communication Conference (OFC), Mar. 19-23, 2017, 3 pages.

Dietrich et al., "In-Situ 3D Nano-Printing of Free-Form Coupling Elements for Hybrid Photonic Integration," Nature Photonics, Mar. 26, 2018, 12 pages.

Dietrich et al., "Printed freeform lens arrays on multi-core fibers for highly efficient coupling in astrophotonic systems," Optics Express, Jul. 24, 2017, 25: 18288-18295.

Gissibl et al., "Sub-micrometre accurate free-form optics by three-dimensional printing on single-mode fibers," Nature Communications, Jun. 23, 2016, 9 pages.

Gorelik et al., "Transmission electron microscopy studies of femtosecond laser induced modifications in quartz," Appl. Phys. A, Mar. 2003, 76: 309-311.

Hughes et al., "A Single-Mode Expanded Beam Separable Fiber Optic Interconnect for Silicon Photonics," Optical Fiber Communication Conference (OFC), paper Tu2A.6, Apr. 25, 2019, 3 pages.

Imai et al., "Direct writing of optical waveguides in fused silica by the fundamental beam of an Yb:KGW femtosecond laser," OSA Continuum, Mar. 15, 2021, 4:1000-1009.

Itoh et al., "Ultrafast Processes for Bulk Modification of Transparent Materials," MRS Bulletin, Aug. 2006, 31:620-625.

Majumder et al., "Ultra-compact polarization rotation in integrated silicon photonics using digital metamaterials," Optical Society of America, Aug. 7, 2017, 11 pages.

Mangale et al., "Through-substrate coupling elements for silicon-photonics based short-reach optical interconnects," Proceedings of the SPIE, Optical Interconnects XIX, 2019, vol. 10924, 13 pages.

Marchetti et al., Coupling strategies for silicon photonics integrated chips, Photonics Research, Feb. 2019, 7(2):201-239.

Missinne et al., "Alignment-tolerant interfacing of a photonic integrated circuit using back side etched silicon microlenses," Proceedings of the SPIE, 2019, 10923, 8 pages.

Nambiar et al., "Grating-Assisted Fiber to Chip Coupling for SOI Photonic Circuits," Applied Sciences, article 1114, Jul. 13, 2018, 22 pages.

Nejadmalayeri et al., "Inscription of optical waveguides in crystalline silicon by mid-infrared femtosecond laser pulses," Optics Letters, May 1, 2005, 30:964-966.

PCT International Search Report and Written Opinion in International Appln. No. PCT/US2021/021953, dated Aug. 4, 2021, 23 pages.

PCT Invitation to Pay Additional Fees in International Appln. No. PCT/US2021/021953, dated May 19, 2021, 2 pages.

Pollnau et al., "Optical waveguides in laser crystals," C. R. Physique, Aug. 8, 2006, pp. 123-137.

Rodenas et al., "High-contrast step-index waveguides in borate nonlinear laser crystals by 3D laser writing," Optics Express, Aug. 29, 2011, 19: 17820-17833.

Sacher et al., "Polarization rotator-splitters in standard active silicon photonics platforms," Optical Society of America, Feb. 10, 2014, 10 pages.

Scarcella et al., "Pluggable Single-Mode Fiber-Array-to-PIG Coupling Using Micro-Lenses," IEEE Photonics Technology Letters, Nov. 25, 2017, 29(22):1943-1946.

Wu et al., "Freeform lens arrays for off-axis illumination in an optical lithography system," Applied Optics, Feb. 10, 2011, 50: 725-732.

Wu et al., "Thin LED collimator with free-form lens array for illumination applications," Applied Optics, Oct. 12, 2012, 51:7200-7205.

Invitation to Pay Additional Fees in International Appln. No. PCT/US2022/0200331, dated May 26, 2022, 3 pages.

International Search Report and Written Opinion in International Appln. No. PCT/US2022/020031, dated Aug. 17, 2022, 37 pages.

International Search Report and Written Opinion in International Appln. No. PCT/US22/72575, dated Aug. 9, 2022, 31 pages.

International Preliminary Report on Patentability in International Appln. No. PCT/US21/21953, dated Sep. 22, 2022, 20 pages.

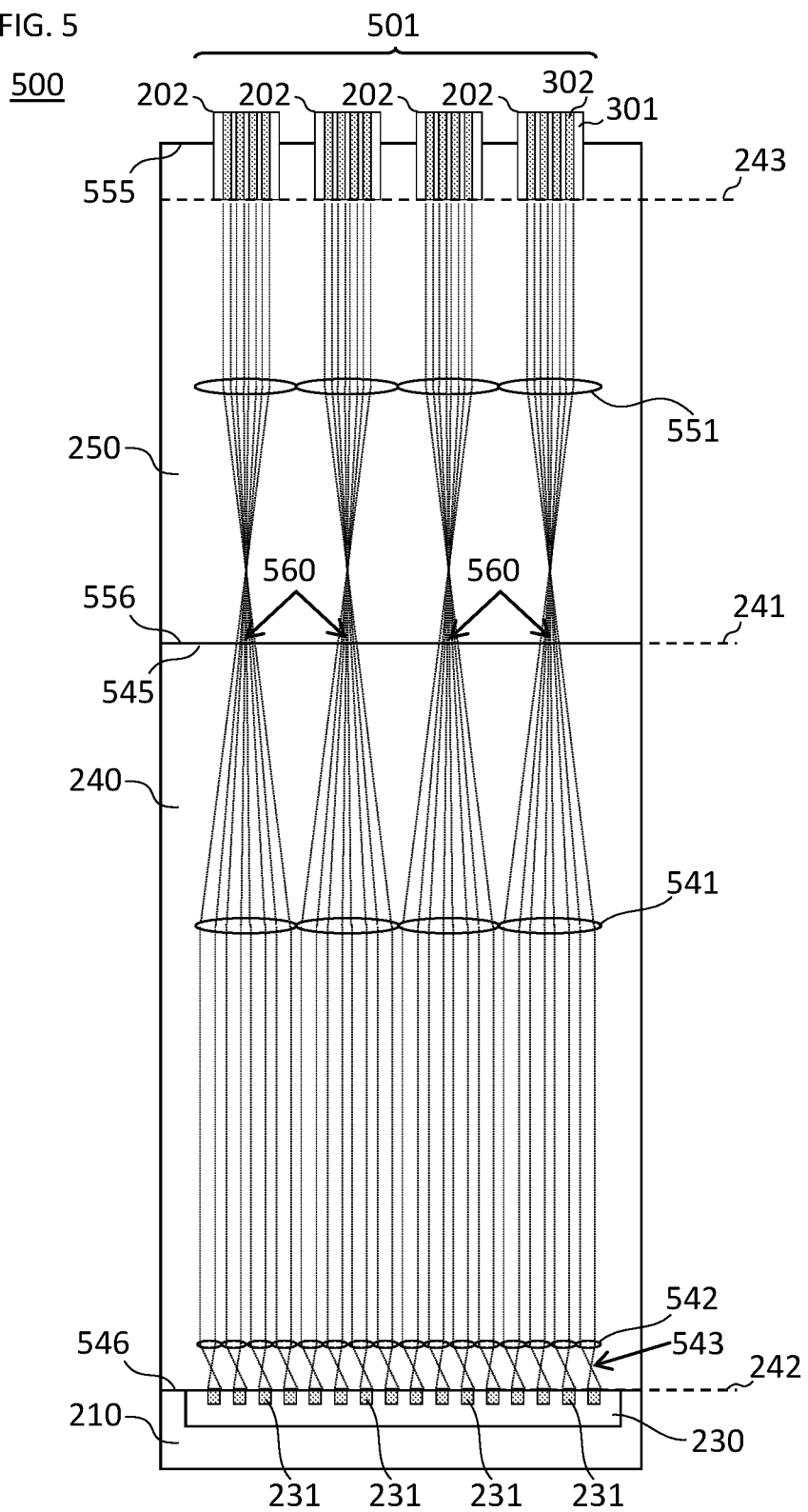

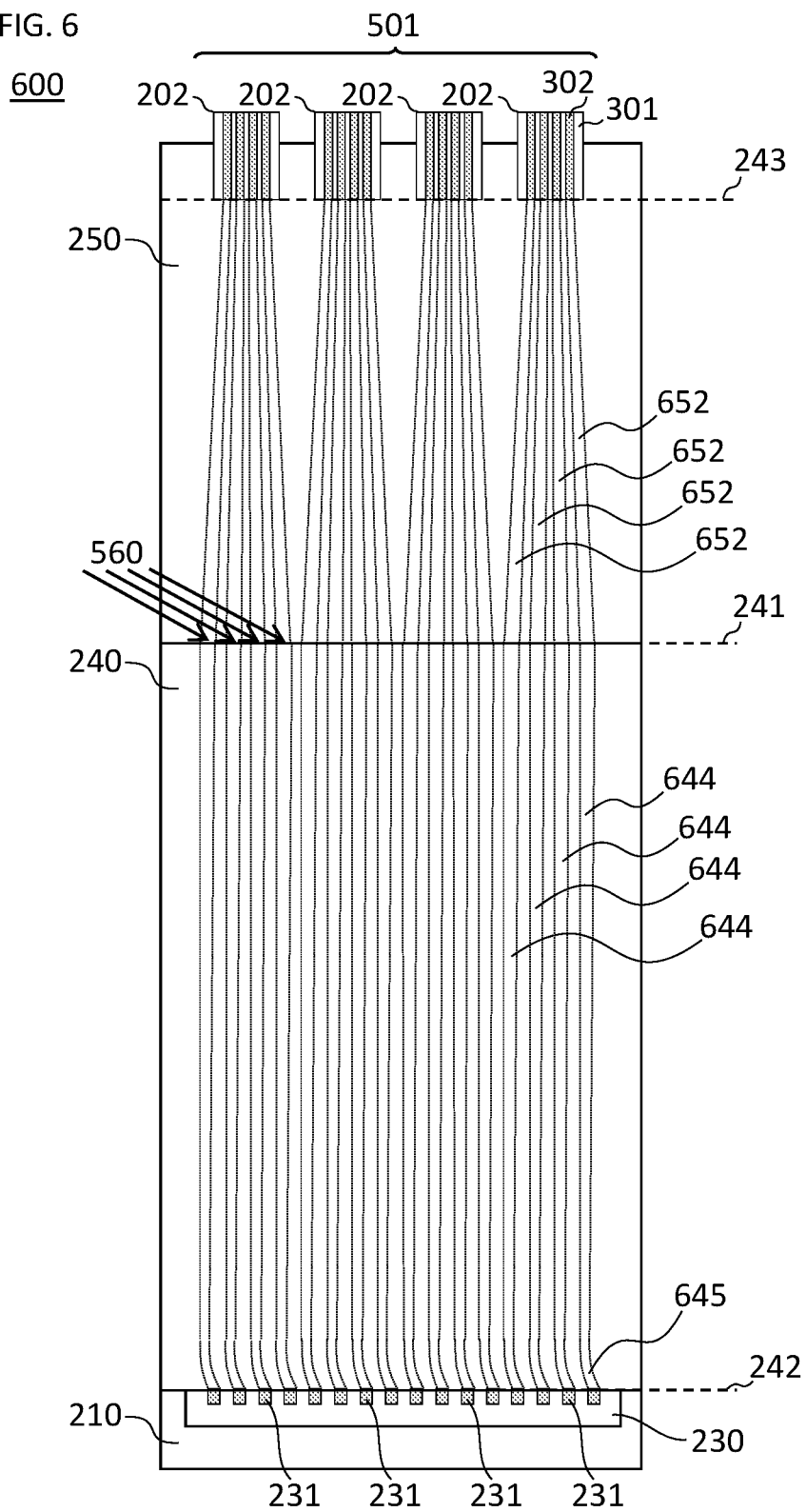

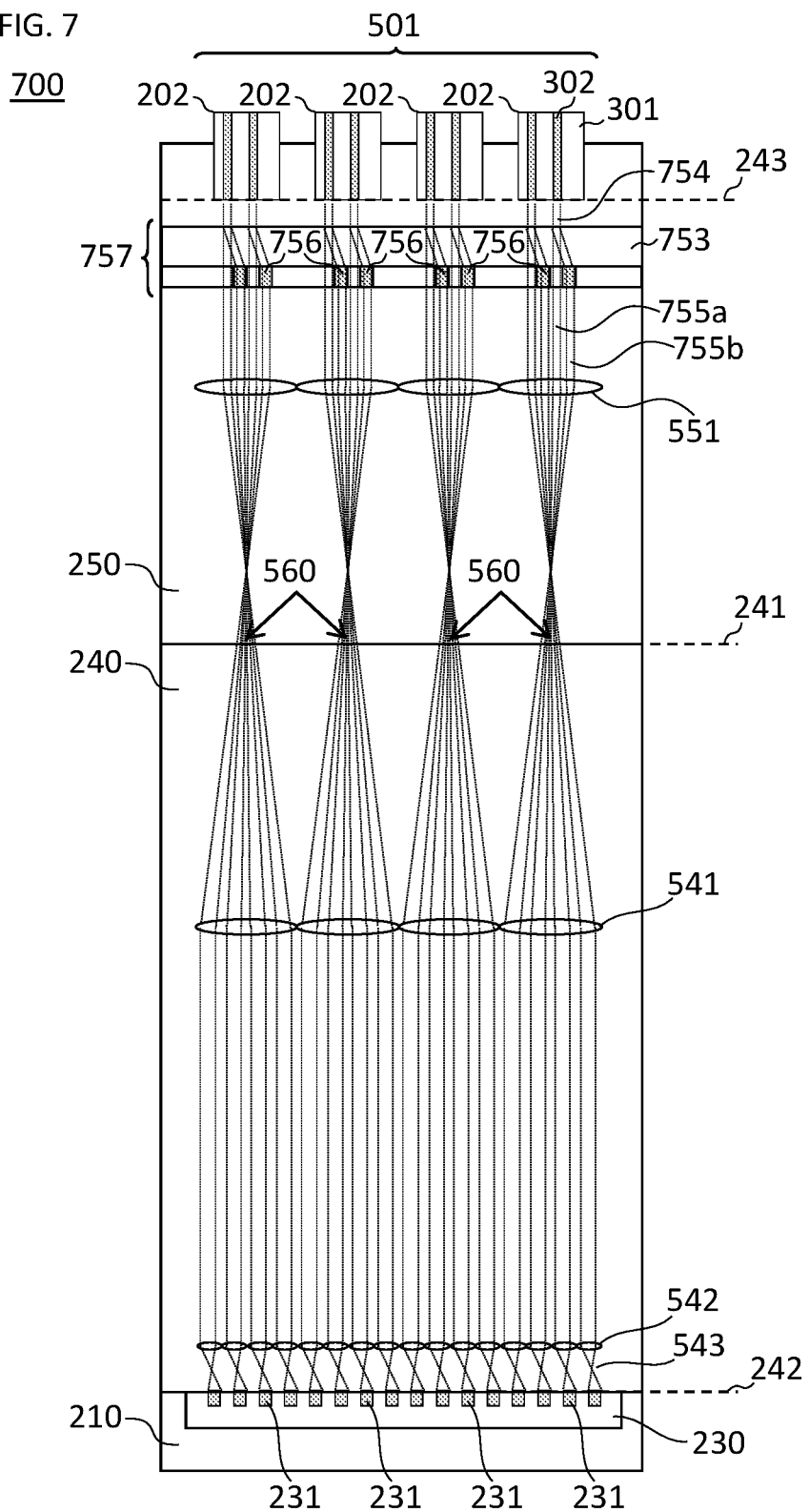

810

820

OPTICAL FIBER-TO-CHIP INTERCONNECTION

CROSS-REFERENCE TO RELATED APPLICATIONS

This application is a continuation application of and claims priority to U.S. application Ser. No. 16/816,171, filed on Mar. 11, 2020. The entire disclosure is incorporated herein by reference in its entirety.

BACKGROUND

Field

Various example embodiments relate to optical communication equipment and, more specifically but not exclusively, to methods and apparatus for interconnecting arrays of optical fibers with planar photonic integrated circuits.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of a connector assembly for optically connecting one or more optical fibers and an array of vertical coupling elements of a photonic integrated circuit (PIC). In various embodiments, the connector assembly is constructed to independently optically scale some feature sizes, such as, for example, the transverse mode size, the array size, the array geometry, and/or various incidence angles, the optical scaling being performed, e.g., from a fiber end face plane to a connector-mating plane and further to a PIC coupling plane. In some embodiments, the connector assembly may support a polarization (de)multiplexing functionality.

According to an example embodiment, provided is an apparatus comprising: one or more optical fibers having a plurality of fiber cores; a photonic integrated circuit including a plurality of vertical-coupling elements disposed along a main surface of the photonic integrated circuit; and a fiber-optic connector connected between the one or more optical fibers and the photonic integrated circuit to communicate light therebetween through the main surface, the fiber-optic connector comprising optics configured to transfer light between the plurality of fiber cores and the plurality of vertical-coupling elements such that: a distance between a first pair of the fiber cores is optically scaled by a first scaling factor, and a diameter of at least one of the fiber cores is optically scaled by a second scaling factor that is different from the first scaling factor.

In some embodiments of the above apparatus, the optics is further configured to transfer the light such that a distance between a second pair of the fiber cores is optically scaled by a third scaling factor that is different from the second scaling factor.

In some embodiments of any of the above apparatus, the optics is configured to transfer the light such that the third scaling factor is different from the first scaling factor.

In some embodiments of any of the above apparatus, the optics is configured to transfer the light such that the first scaling factor is substantially equal to the third scaling factor.

In some embodiments of any of the above apparatus, the optics comprises one or more first lenses located at a first offset distance from the main surface, a plurality of second lenses located at a second offset distance from the main surface, the second offset distance being smaller than the first offset distance, and a plurality of third lenses located at a third offset distance from the main surface, the third offset distance being smaller than the second offset distance.

In some embodiments of any of the above apparatus, the optics comprises at least one lens configured to communicate light with a single one of the fiber cores and a single one of the vertical-coupling elements.

In some embodiments of any of the above apparatus, the optics comprises a plurality of optical waveguides, each optically connecting a respective one of the fiber cores and a respective one of the vertical-coupling elements.

In some embodiments of any of the above apparatus, at least some of the optical waveguides are tapered.

In some embodiments of any of the above apparatus, the optics comprises one or more polarization beam splitters.

In some embodiments of any of the above apparatus, the optics comprises one or more polarization-rotating elements.

In some embodiments of any of the above apparatus, the fiber-optic connector comprises a first connector part and a second connector part disconnectably connected to one another.

In some embodiments of any of the above apparatus, the optics is configured to produce, at a mating surface between the first and second connector parts, light spots of a larger size, by at least a factor of two, than corresponding diameters of the fiber cores.

In some embodiments of any of the above apparatus, the optics is configured to communicate light between a first number of the fiber cores and a second number of the vertical-coupling elements, the second number being greater than the first number.

In some embodiments of any of the above apparatus, the one or more optical fibers include a multi-core optical fiber.

In some embodiments of any of the above apparatus, each of the vertical-coupling elements is selected from an element set consisting of: a single-polarization vertical grating coupler, a turning mirror, a polarization-diversity vertical grating coupler, a vertical cavity surface emitting laser, a surface-normal modulator, and a photodiode.

According to another example embodiment, provided is a fiber-optic connector comprising a first connector part connectable at a first side thereof to one or more optical fibers having a plurality of fiber cores, the first connector part having a second side that is opposite to the first side, a second connector part connectable at one side thereof to the second side of the first connector part and further connectable at an opposite side thereof to a photonic integrated circuit, and optics configured to transfer light between the first side of the first connector part and the opposite side of the second connector part such that a distance between a first pair of the fiber cores is optically scaled by a first scaling factor, and a diameter of at least one of the fiber cores is optically scaled by a second scaling factor that is different from the first scaling factor.

In some embodiments of the above fiber-optic connector, the optics is further configured to transfer the light such that a distance between a second pair of the fiber cores is optically scaled by a third scaling factor that is different from the second scaling factor.

In some embodiments of any of the above fiber-optic connectors, the optics is configured to transfer the light such that the third scaling factor is different from the first scaling factor.

In some embodiments of any of the above fiber-optic connectors, the optics is configured to transfer the light such that the first scaling factor is substantially equal to the third scaling factor.

In some embodiments of any of the above fiber-optic connectors, the optics comprises one or more first lenses located at a first offset distance from the opposite side of the second connector part, a plurality of second lenses located at a second offset distance from the opposite side of the second connector part, the second offset distance being smaller than the first offset distance, and a plurality of third lenses located at a third offset distance from the opposite side of the second connector part, the third offset distance being smaller than the second offset distance, said first, second, and third distances being measured with the first and second connector parts being connected to one another.

In some embodiments of any of the above fiber-optic connectors, the optics comprises at least one lens configured to communicate light with a single one of the fiber cores and a single one of vertical-coupling elements of the photonic integrated circuit.

In some embodiments of any of the above fiber-optic connectors, the optics comprises a plurality of optical waveguides, each disposed to optically connect a respective one of the fiber cores and a respective one of vertical-coupling elements of the photonic integrated circuit.

In some embodiments of any of the above fiber-optic connectors, at least some of the optical waveguides are tapered.

In some embodiments of any of the above fiber-optic connectors, the optics comprises one or more polarization beam splitters.

In some embodiments of any of the above fiber-optic connectors, the optics comprises one or more polarization-rotating elements.

BRIEF DESCRIPTION OF THE DRAWINGS

Other aspects, features, and benefits of various disclosed embodiments will become more fully apparent, by way of example, from the following detailed description and the accompanying drawings, in which:

FIG. 5 shows a schematic cross-sectional side view of a fiber-to-PIC connector arrangement that can be used in the integrated optical device of FIG. 2 according to an embodiment;

FIG. 6 shows a schematic cross-sectional side view of a fiber-to-PIC connector arrangement that can be used in the integrated optical device of FIG. 2 according to another embodiment;

FIG. 7 shows a schematic cross-sectional side view of a fiber-to-PIC connector arrangement that can be used in the integrated optical device of FIG. 2 according to yet another embodiment.

DETAILED DESCRIPTION OF SOME EMBODIMENTS

To accommodate the growing need for chip-to-chip interconnection bandwidths, the use of optical I/Os may be beneficial.

Figure 1:
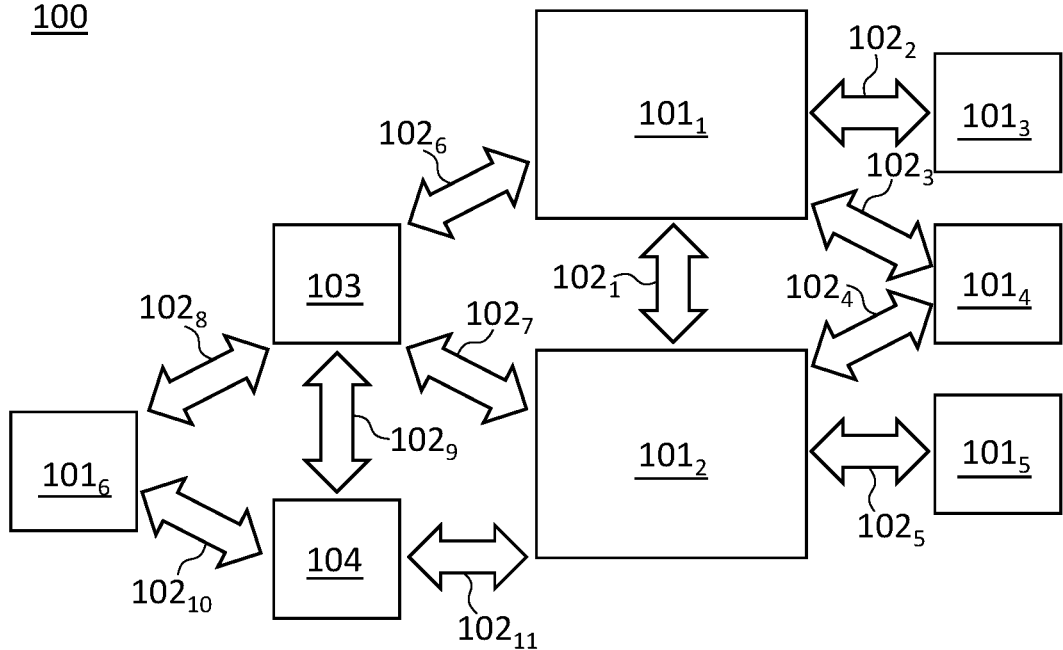
FIG. 1 shows a block diagram of an optical communication system in which at least some embodiments may be practiced.

FIG. 1 shows a block diagram of a communication system 100 in which at least some embodiments may be practiced. As shown, system 100 comprises integrated optical communication devices $101_1$-$101_6$ suitably interconnected by optical fibers $102_1$-$102_{11}$ establishing communication paths between the optical communication devices.

Communication system 100 may also comprise one or more external optical power supply modules 103 producing continuous-wave (CW) light or producing one or more trains of periodic or non-periodic optical pulses for use in one or more of the integrated optical communication devices $101_1$-$101_6$. Some end-to-end communication paths may pass through external optical power supply modules 103 (e.g., see the shown communication path between devices $101_2$ and $101_6$). For example, the communication path between devices $101_2$ and $101_6$ may be jointly established by optical fiber links $102_7$ and $102_8$, whereby light from external optical power supply 103 is multiplexed onto optical fiber links $102_7$ and $102_8$. Some end-to-end communication paths may pass through a multiplexing unit 104 (e.g., see the shown communication path between devices $101_2$ and $101_6$). For example, the communication path between devices $101_2$ and $101_6$ may be jointly established by optical fiber links $102_{10}$ and $102_{11}$, whereby light from external optical power supply 103 may be multiplexed within multiplexing unit 104 onto optical fiber links $102_{10}$ and $102_{11}$.

Various elements of communication system 100 may benefit from the use of optical interconnects, which may use photonic integrated circuits comprising optoelectronic devices, co-packaged and/or co-integrated with electronic chips comprising integrated circuits.

As used herein, the term "photonic integrated circuit" (or PIC) should be construed to cover planar lightwave circuits (PLCs), integrated optoelectronic devices, wafer-scale products on substrates, individual photonic chips and dies, and hybrid devices. Example material systems that can be used for manufacturing various PICs may include but are not limited to III-V semiconductor materials, silicon photonics, silica-on-silicon products, silica-glass-based PLCs, polymer integration platforms, Lithium Niobate and derivatives, non-linear optical materials, etc. Both packaged devices (e.g., wired-up and/or encapsulated chips) and unpackaged devices (e.g., dies) can be referred to as PICs.

PICs are used for various applications in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding. A PIC typically comprises a planar substrate onto which optoelectronic devices are grown by an additive manufacturing process and/or into which optoelectronic devices are etched by a subtractive manufacturing processes, e.g., using a multi-step sequence of photolithographic and chemical processing steps.

An "optoelectronic device" can operate on both light and electrical currents (voltages) and may include one or more of: (i) an electrically driven light source, such as a laser diode; (ii) an optical amplifier; (iii) an optical-to-electrical converter, such as a photodiode; and (iv) an optoelectronic component that can control the propagation and/or certain properties of light, such as an optical modulator or a switch. The corresponding optoelectronic circuit may additionally include one or more optical elements and/or one or more electronic components that enable the use of the circuit's optoelectronic devices in a manner consistent with the circuit's intended function. Some optoelectronic devices may be implemented using one or more PICs.

As used herein, the term "integrated circuit" (IC) should be construed to encompass both a non-packaged die and a packaged die. In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a larger circuit or be left non-packaged.

The term "hybrid circuit" may refer to a multi-component circuit constructed of multiple monolithic ICs and possibly some discrete circuit components, all attached to each other to be mountable on and electrically connectable to a common base or carrier. A representative hybrid circuit may include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, dies, and discrete components can be formed, e.g., using patterned conducting (such as metal) layers, ball-grid arrays, solder bumps, wire bonds, etc. The individual ICs may include any combination of one or more respective substrates, one or more redistribution layers (RDLs), one or more interposers, one or more laminate plates, etc.

In some embodiments, individual chips can be stacked. As used herein, the term "stack" refers to an orderly arrangement of packaged or non-packaged dies in which the main planes of the stacked dies are substantially parallel to each other. A stack can typically be mounted on a carrier in an orientation in which the main plains of the stacked dies are parallel to each other and/or to the main plane of the carrier.

A "main plane" of an object, such as a die, a PIC, a substrate, or an IC, is a plane parallel to a substantially planar surface thereof that has the largest sizes, e.g., length and width, among all exterior surfaces of the object. This substantially planar surface may be referred to as a main surface. The exterior surfaces of the object that have one relatively large size, e.g., length, and one relatively small size, e.g., height, are typically referred to as the edges of the object.

Figure 2:
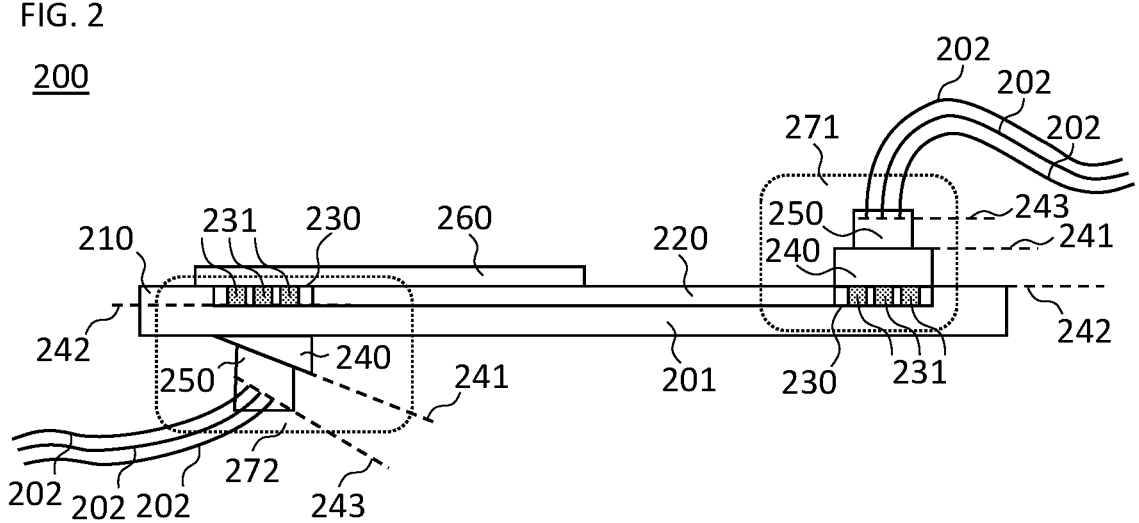
FIG. 2 shows a schematic side view of an integrated optical device that can be used in the optical communication system of FIG. 1 according to an embodiment.

FIG. 2 shows a schematic cross-sectional side view of an example integrated optical communication device 200 according to an embodiment. Device 200 can be used, e.g., to implement one or more of devices $101_1$-$101_6$ of FIG. 1.

Device 200 comprises a PIC 210 that is based on any suitable PIC technology/material platform, such as, without any implied limitation, Silicon Photonics, Indium Phosphide, or Lithium Niobate. PIC 210 has supported on a substrate 201 thereof suitably connected passive optical elements and/or arrays thereof, such as waveguides 220, couplers, splitters, filters, delay lines, etc., as well as optoelectronic elements and/or arrays thereof such as modulators, detectors, and tunable phase shifters. Some of these elements may be vertical-coupling elements 231, configured to couple light to/from the PIC. Herein, the "vertical" direction is a direction that is perpendicular to a main surface of the PIC. In the context of this disclosure, the term "vertical-coupling" denotes coupling at an angle that is substantially out-of-plane relative to a main surface of substrate 201, but not necessarily perpendicular to said main surface. Vertical coupling is typically implemented at angles between 0 degrees (perpendicular) and 45 degrees as measured from the surface-normal of the substrate's main surface. Vertical coupling may be performed from the top-side (e.g., the waveguide-side) of the PIC (271 in FIG. 2) or from the bottom-side (e.g., the substrate-side) of the PIC (272 in FIG. 2).

In some embodiments, vertical-coupling elements 231 may be implemented, e.g., as turning mirrors, vertical grating couplers, elephant couplers, or as 3D vertical coupling structures that are 3D-printed onto the PIC, suitably connected to passive optical elements or to optoelectronic elements. In an example embodiment, vertical-coupling elements 231 may be implemented, e.g., using any of the vertical-coupling elements disclosed in the following patent literature: US 2015/0037044, US 2015/0125110, US 2015/0293305, U.S. Pat. No. 9,927,575, US 2018/0329159, US 2019/0258175, and U.S. Ser. No. 10/025,043. All of these U.S. Patents and U.S. Patent Application Publications are incorporated herein by reference in their entirety.

In some embodiments, vertical-coupling elements 231 may be surface-normal optoelectronic elements such as surface-normal modulators, surface-normal detectors, or surface-normal lasers, e.g, vertical-cavity surface emitting lasers (VCSELs). In an example embodiment, vertical-coupling elements 231 may be implemented, e.g., using any of the vertical-coupling elements disclosed in U.S. Patents and U.S. Patent Application Publication(s) US 2019/0312642, U.S. Ser. No. 10/025,043, and U.S. Pat. No. 8,488,921, all of which are incorporated herein by reference in their entirety.

Vertical-coupling elements 231 may be geometrically variously arranged in arrays 230 of such vertical-coupling elements.

In some embodiments, some optical or optoelectronic elements may be spatially co-located or interspersed with some vertical-coupling elements 231 of array 230.

In some embodiments, some optical or optoelectronic elements may be located in areas of the PIC disjoint from vertical-coupling arrays 230.

Optical and optoelectronic elements of the PIC are suitably connected to electronic integrated circuits 260, such as driver amplifiers, transimpedance amplifiers, electronic control circuits, digital logic, microcontrollers, microprocessors, and/or electronic switches. Some electronic circuits may be spatially co-located or interspersed with some vertical-coupling elements of arrays 230, and some electronic circuits may be located in areas that are spatially disjoint from arrays 230. Some electronic circuits may be monolithically integrated with optical or optoelectronic elements of the PIC. Some electronic circuits may be on a separate chip from the PIC and may be electrically connected to the PIC using suitable electrical interconnect technologies, such as bond wires, balls, bumps, micro-bumps, pillars, and membranes, e.g., in the form of a stack.

Of particular interest in the context of this disclosure are connector structures 271 and 272 that enable (possibly pluggable and/or removable) connection(s) between M spatial paths of one or more optical fibers 202 as part of optical fiber links 102, and N vertical-coupling elements of an array 230 of a PIC. In some embodiments, the numbers N and M are different integers greater than one. In some other embodiments, N=M.

In the context of this disclosure, the term "spatial path" refers to an optical path through a core of a single-mode or multi-mode optical fiber, a core of a multi-core fiber, or one or more spatially coupled cores of a few-mode optical fiber configured to carry different signals in its different spatial modes. A spatial path may carry signals in one or more polarizations and/or on one or more wavelengths. In some embodiments, a spatial path may be polarization-maintaining. The one or more optical fibers 202 may comprise single-mode, multi-mode, few-mode, multi-core, and/or polarization-maintaining fibers. The one or more optical fibers 202 may comprise dispersion-shifted, dispersion-compensating, non-zero-dispersion-shifted, standard-single-mode-dispersion, and/or high-dispersion fiber. The one or more fibers 202 may be fixedly attached (e.g., glued) to connector elements 250, e.g., by positioning individual fibers in individual holes provided within connector elements 250, or by positioning individual fibers in a linear array of V-grooves and stacking multiple such linear arrays to form a 2D array. The M spatial paths of one or more fibers 202 may, as a result, form an array with a certain geometrical layout and with a certain separation of spatial paths in fiber end face planes 243. Fiber end face planes 243 may be parallel to a main surface of the PIC (e.g., as indicated in the shown details of structure 271, FIG. 2) or may be at a non-zero angle relative to a main surface of the PIC (e.g., as indicated in the shown details of structure 272, FIG. 2). In various embodiments, said angle relative to the main surface of the PIC may be appropriately chosen between 0 degrees (in which case the corresponding fiber end face plane is parallel to the main surface of the PIC) and 90 degrees (in which case the corresponding fiber end face plane is perpendicular to the main surface of the PIC).

Connector elements 240 may be fixedly attached (e.g., glued) to PIC 210, e.g., by aligning and subsequently affixing the connector elements to PIC 210 during assembly. Connector elements 240 may be attached to either of the two main surfaces of PIC 210. Connector elements 240 may be fixedly or movably attached to connector elements 250 in connector mating planes 241. Connector mating planes 241 may be parallel to a main surface of the PIC (e.g., as in structure 271 of FIG. 2) or may be at an angle relative to a main surface of the PIC (e.g., as in structure 272 of FIG. 2). Said angle relative to the main surface of the PIC may be chosen between 0 degrees (in which case the corresponding connector mating plane is parallel to the main surface of the PIC) and 90 degrees (in which case the corresponding connector mating plane is perpendicular to the main surface of the PIC). In some embodiments, connector elements 240 and 250 may comprise mechanical structures that enable elements 240 and 250 to self-align. For example, such mechanical structures may be implemented using cylindrical or conical post-and-hole arrangements, rod-and-groove arrangements, or ball-and-hole arrangements. Connector elements 240 and 250 may further comprise mechanical structures capable of holding elements 240 and 250 in place after mating, e.g., a suitable snap-on mechanism.

Either of connector elements 240 and 250 may contain one or more of: (i) reflective optical elements, such as dielectric or metallic interfaces; (ii) refractive optical elements, such as lenses or prisms; (iii) diffractive optical elements, such as gratings; (iv) birefringent optical elements, such as calcite crystals, polarization gratings, or waveplates; (v) 3D-waveguides or nanostructures written into a suitable host material, such as glass; and/or (vi) 3D-printed optical waveguides, microstructures, or nanostructures. The combination of connector elements 240 and 250 is typically designed to suitably map M spatial paths of one or more optical fibers 202 in fiber end face planes 243 to N vertical-coupling elements of array 230 in coupling plane 242. Together, the corresponding set of fibers 202, connector elements 240 and 250, and vertical coupling array 230 form a connector assembly 271 or 272. Some embodiments disclosed herein are specifically directed at providing optimized designs of connector assemblies 271 and 272, e.g., with respect to tolerances in manufacturing, assemblage, and operation. Some of such embodiments may be scalable to a relatively large number of spatial paths, e.g., M>100.

FIGS. 3A-3G illustrate configurations of one or more optical fibers 202 according to some embodiments. More specifically, FIGS. 3A-3G schematically show example cross-sectional views of one or more fibers 202 in fiber coupling planes 243 according to various embodiments.

Figure 3A:
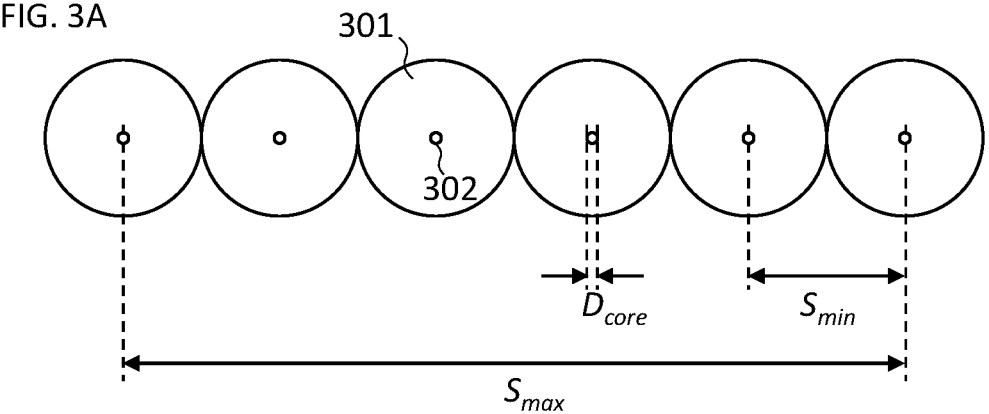
FIGS. 3A-3G schematically show various examples of one or more fibers that can be used in the optical communication system of FIG. 1 according to some embodiments.

FIG. 3A illustrates a one-dimensional (1D) array of single-core, single-mode optical fibers supporting M=6 spatial paths. Each of the shown six fibers comprises a respective cladding 301 and a respective core 302, typically made from glasses of different refractive indices such that the refractive index of the cladding is lower than the refractive index of the core to establish a dielectric optical waveguide. More complex refractive index profiles, such as index trenches, multi-index profiles, or gradually changing refractive index profiles may also be used in some embodiments. More complex geometric structures such as non-circular cores or claddings, photonic crystal structures, photonic bandgap structures, or nested antiresonant nodeless hollow core structures may also be used in some embodiments. For any of these structures, geometrical, structural, and material properties may be appropriately chosen to allow for the propagation of a single guided (e.g., transverse) mode within the operating wavelength range of system 100. In the context of this disclosure, three feature sizes are of particular interest: (i) an effective core diameter $D_{core}$, typically defined as the diameter at which the optical intensity of the mode propagating within the fiber has dropped to $1/e^2$ of its value at the core center (sometimes also referred to as the mode field diameter); (ii) a minimum core-to-core spacing $S_{min}$ within the array; and (iii) a maximum core-to-core spacing $S_{max}$ within the array. The feature sizes $D_{core}$, $S_{min}$, and $S_{max}$ corresponding to this particular embodiment are indicated in FIG. 3A.

Figure 3B:
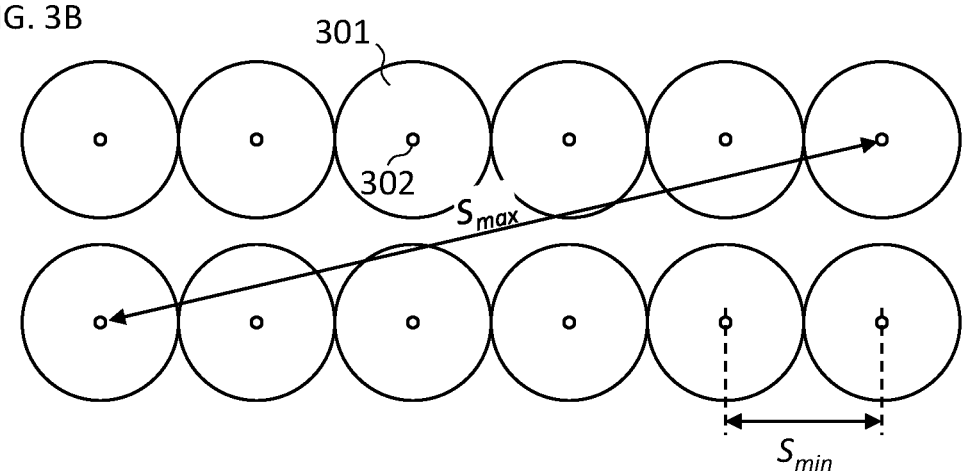

FIG. 3B illustrates a two-dimensional (2D) array of single-core, single-mode optical fibers supporting M=12 spatial paths. The feature sizes $S_{min}$ and $S_{max}$ corresponding to this particular embodiment are indicated in FIG. 3B.

Figure 3C:
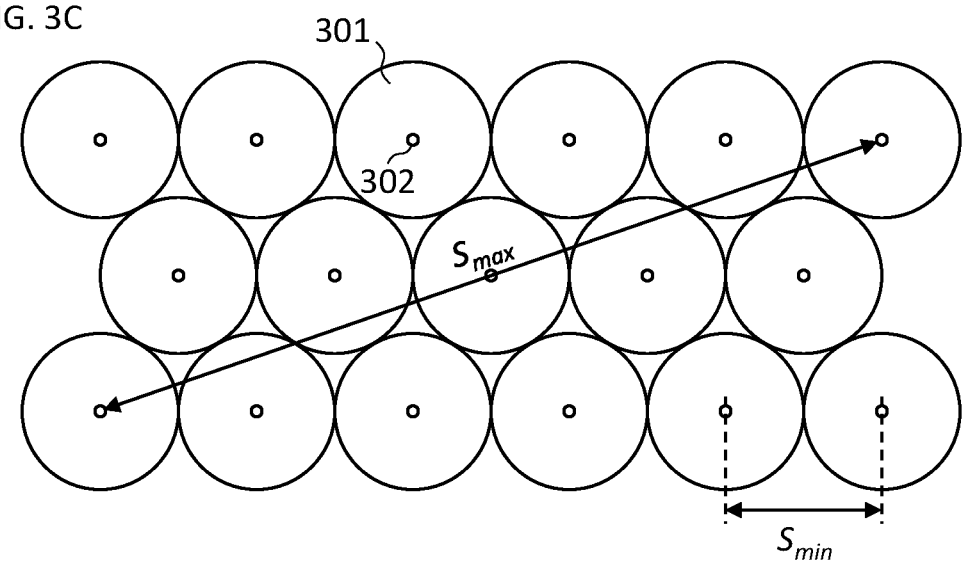

FIG. 3C illustrates a two-dimensional (2D) array of single-core, single-mode optical fibers supporting M=17 spatial paths. The feature sizes $S_{min}$ and $S_{max}$ corresponding to this particular embodiment are indicated in FIG. 3C.

Although only three example geometrical array layouts and spacings are shown in FIGS. 3A-3C, other geometrical array layouts may also be used in various alternative embodiments. Based on the provided description, a person of ordinary skill in the art will be able to make and use such other geometrical array layouts without any undue experimentation. Some embodiments may also be constructed using one or more arrays of fibers with dissimilar properties, such as a mixture of fibers with different index profiles, different effective core diameters, etc.

Figure 3D:
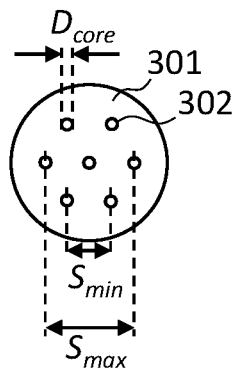

FIG. 3D illustrates a multi-core, single-mode optical fiber supporting M=7 spatial paths. The multi-core fiber comprises a cladding 301 and seven cores 302, typically made from glasses of different refractive indices such that the refractive index of the cladding is lower than the refractive index of the core. More complex refractive index profiles, such as index trenches, multi-index profiles, or gradually changing refractive index profiles, may also be used in some embodiments. More complex geometric structures, such as non-circular cores, non-circular claddings, photonic crystal structures, photonic bandgap structures, or nested antiresonant nodeless hollow core structures, may also be used. For any of these structures, geometrical, structural, and material properties may be chosen to allow for the propagation of a single guided (e.g., transverse) mode per core within the operating wavelength range of system 100. Regardless of their complexity, an effective core diameter $D_{core}$ may be defined for each core. Different cores within a fiber may have nominally identical or substantially different (e.g., by more than 10%) effective core diameters. The feature sizes $D_{core}$, $S_{min}$, and $S_{max}$ corresponding to this particular embodiment are indicated in FIG. 3D.

Figure 3E:
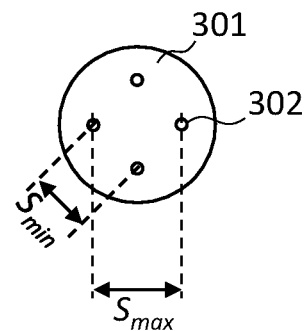

FIG. 3E illustrates a multi-core, single-mode optical fiber supporting M=4 spatial paths. The feature sizes $S_{min}$ and $S_{max}$ corresponding to this particular embodiment are indicated in FIG. 3E.

Figure 3F:
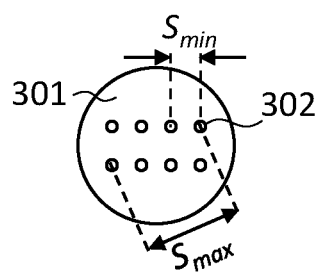

FIG. 3F illustrates a multi-core, single-mode optical fiber supporting M=8 spatial paths. The feature sizes $S_{min}$ and $S_{max}$ corresponding to this particular embodiment are indicated in FIG. 3F.

Figure 3G:
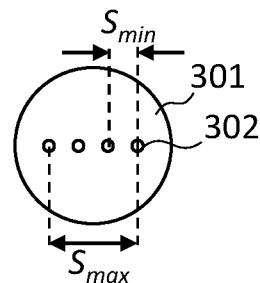

FIG. 3G illustrates a multi-core, single-mode optical fiber supporting M=4 spatial paths. The feature sizes $S_{min}$ and $S_{max}$ corresponding to this particular embodiment are indicated in FIG. 3G.

Although only four example geometrical core layouts and spacings are shown in FIG. 3D-3G, other geometrical core layouts may also be used in various alternative embodiments. Based on the provided description, a person of ordinary skill in the art will be able to make and use such other geometrical core layouts without any undue experimentation.

Figure 4:
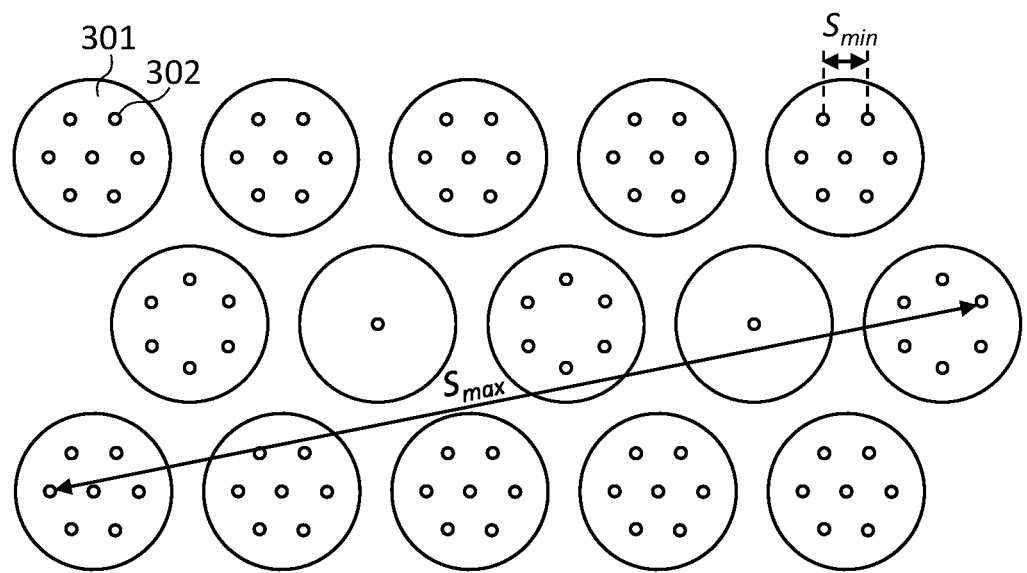
FIG. 4 schematically shows an example array of fibers that can be used in the optical communication system of FIG. 1 according to an embodiment.

FIG. 4 illustrates a configuration of one or more optical fibers 202 according to some embodiments. More specifically, FIG. 4 schematically shows an example cross-sectional view of one or more fibers 202 in fiber coupling planes 243 according to various embodiments. FIG. 4 illustrates an example two-dimensional (2D) array of multi-core, single-mode optical fibers supporting M=90 spatial paths. In some embodiments, different fibers within the array may have different respective core counts, different respective effective core diameters, and/or different respective rotational orientations. The feature sizes $S_{min}$ and $S_{max}$ corresponding to this particular embodiment are indicated in FIG. 4.

In some embodiments, some cores of some multi-core fibers shown in FIGS. 3D-H and FIG. 4 may be designed to be substantially un-coupled, e.g., exhibit a core-to-core crosstalk lower than 20 dB over 1 km of propagation distance, or may be designed to be relatively strongly coupled. Some cores of single-core and/or multi-core fibers shown in FIGS. 3 and 4 may be designed to be few-moded or multi-moded, i.e. may be designed to propagate a relatively small number (e.g., <10) or a relatively large number (e.g., >10) of transverse modes.

An important additional aspect of coupling a large number of spatial paths from fibers 202 to a PIC 210 may include the consideration of relative sizes of practically usable fibers and optical, optoelectronic, and electronic elements, and their placement within the corresponding large arrays. For example, relatively close needed spacing(s) in some areas of the PIC may indicate that forming larger arrays may be difficult, which poses a difficult scalability problem. In addition, in some cases, the relative alignment of a typical fiber core and a typical vertical grating coupler may require a placement accuracy on the order of 1 micron or better to achieve low coupling losses. However, such requirements may not be compatible with the typical accuracies achieved using conventional passive alignment processes, which may disadvantageously necessitate the use of slower and/or more expensive active alignment processes.

Having studied some of the shortcomings of existing fiber-to-PIC coupling structures, I have identified and examined, through analyses, modeling, and simulations, various designs of optical coupling structures for removable fiber-to-PIC connections suitable for high-volume manufacturing of arrays supporting a large number of spatial paths. In particular, the contemplated solutions may allow for efficient coupling between M spatial paths of one or more optical fibers 202 and an array 230 of N vertical-coupling elements by implementing some or all of the following features: (i) magnifying or de-magnifying by a first factor (denoted as A) the minimum core-to-core spacing of optical fibers in fiber end face plane 243 to match the minimum spacing between vertical-coupling elements in coupling plane 242; (ii) magnifying or de-magnifying by a second factor (denoted as B) the maximum core-to-core spacing of optical fibers in fiber end face plane 243 to match the maximum spacing between vertical-coupling elements in coupling plane 242; (iii) magnifying or de-magnifying by a third factor (denoted as $C_1$) the effective core diameter of optical fibers in fiber end face plane 243 to match the effective vertical grating coupler sizes in coupling plane 242; (iv) magnifying or de-magnifying by a fourth factor (denoted as $C_2$) the effective core diameter of optical fibers in fiber end face plane 243 to achieve a substantially different (e.g., larger) effective beam diameter in connector mating plane 241 than in fiber end face plane 243; and/or (v) changing the effective cross-sectional geometrical layout of the plurality of spatial paths in at least some regions between fiber end face plane 243, connector mating plane 241, and coupling plane 242. In an example embodiment, at least some or all of the factors A, B, $C_1$, and $C_2$ may be different.

For an example of possible benefits that may be obtained, one may consider an example embodiment in which A=B=2 and $C_1=1.5$. In this particular embodiment, the scaling by $C_1$ allows for relaxed alignment tolerances of the connector component 240 to be attached to a PIC 210. The scaling by A and B allows for even more relaxed optical waveguide spacings within the PIC 210, thereby potentially lowering the waveguide-to-waveguide crosstalk and/or enabling the use of relatively large arrays.

FIG. 5 shows a fiber-to-PIC connector arrangement 500 that can be used in device 200 (FIG. 2) according to an embodiment. As shown, connector arrangement 500 comprises an array 501 of multi-core fibers (MCFs) 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

Connector element 250 includes one collimating lens 551 per MCF 202. In an example embodiment, collimating lenses 551 may be arranged to provide enlarged light-beam-spot sizes in connector mating plane 241. For example, an effective core diameter of 10 micron together with the focal length $f_1$ of collimating lens 551 being $f_1=500$ micron may result in an effective beam diameter of approximately 100 micron in connector mating plane 241.

Connector element 240 includes one focusing lens 541 per MCF 202. The longitudinal sizes of connector elements 240 and 250 may be selected such as to have the connector mating plane 241 at any convenient position between collimating lenses 551 and focusing lenses 541. For example, such sizes may be selected such as to achieve an expansion of the beam diameter in connector mating plane 241 by a factor of $C_2 \approx 10$. Such expansion may be beneficial in that it may significantly simplify the connector alignment. In alternative embodiments, other longitudinal sizes may similarly be selected to realize other values of the factor of $C_2$.

In the example embodiment shown in FIG. 5, each focusing lens 541 has a focal length $f_2=2f_1$. This ratio of focal lengths results in a magnification of each MCF's entire core pattern by a factor of $A=2$ in coupling plane 242. For example, the minimum core-to-core spacing $S_{min}$ (e.g., see FIG. 3D) is magnified in coupling plane 242 by a factor of two as well. This magnification applies both to the spacing(s) of the MCF cores and to the characteristic mode size(s) corresponding to each individual core.

In order to independently choose the effective magnification applied to an individual spatial path, between fiber end face plane 243 and coupling plane 242, each spatial path is directed through a respective individual lens 542. For example, in the embodiment of FIG. 5, each individual lens 542 has a focal length $f_3=70$ micron and hence relatively de-magnifies by 75%. As a result the overall characteristic-mode-size magnification $C_1=2\times0.75=1.5$ is achieved. The larger effective mode size in coupling pane 242 compared to fiber end face plane 243 may advantageously help to relax the positioning tolerances of connector element 240 relative to the array of vertical coupling elements 230 in coupling plane 242.

In some embodiments, some or all lenses 542 may be laterally offset from the centers of the corresponding impinging light beams. Such lateral offsets cause the light beams 543 that are directed toward the vertical-coupling elements 231 of array 230 to impinge at said coupling elements at a desired coupling angle, e.g., not necessarily along the normal with respect to the corresponding PIC's main surface. Note that the maximum core-to-core spacing is left substantially unchanged in this example, as the applied magnification occurs on a per-MCF basis, thereby implementing the B value of $B \approx 1$.

In the above-described example, the geometry-scaling parameter set $\{A, B, C_1, C_2\}$ is approximately $\{2, 1, 1.5, 10\}$. However, other numerical combinations for the geometry-scaling parameter set $\{A, B, C_1, C_2\}$ are also achievable, e.g., through proper selection of relevant sizes, positions, and focal lengths. From the above description, a person of ordinary skill in the art will be able to achieve such other numerical combinations, as needed, without any undue experimentation.

Furthermore, the lens system illustrated by FIG. 5 represents only one of many possible ways to perform independent array pattern scaling and mode size scaling using refractive optical elements. For example, a given array pattern scaling may take place over any distinct subset of spatial paths corresponding to fiber end face plane 243. Different subsets may have identical or different respective magnification factors. When individual subsets are differently scaled, the overall array pattern geometry of fiber end face plane 243 may be transformed to yield a geometrically dissimilar array pattern in coupling plane 242.

In some embodiments, pattern scaling may also take place over the entire set of spatial paths corresponding to fiber end face plane 243, e.g., by using a single lens element 551 that laterally spans the entire array 501, thereby yielding in coupling plane 242 a geometrically similar, scaled image of array 501, as the latter is presented to the lens system in fiber end face plane 243. An example embodiment using this design may achieve a parameter set $\{A, B, C_1, C_2\}$ of $\{2, 2, 1.5, 10\}$.

In some embodiments, mode field diameter scaling may take place over any subset of spatial paths corresponding to fiber end face plane 243 and may use identical or different respective scaling (e.g., magnification) factors for different spatial paths.

In some embodiments, aspheric lenses and arrays thereof may be used. Such lenses may be manufacturable, e.g., using wafer-scale processing technologies.

In some embodiments, the functionalities of lenses 541 and 542 may be combined into a single aspheric refractive element, which may be 3D printed using technologies, such as those offered for sale by Nanoscribe of Eggenstein-Leopoldshafen, Germany.

As will be understood by people of ordinary skill in the art, setting the angle of the fibers 202 relative to the PIC's main plane as well as choosing the incidence angles of the individual light beams 543 onto vertical coupler array 230 are also possible, e.g., by mounting fibers 202 in a slanted or bent fashion within connector element 250, slanting the connector mating plane 241 at an angle relative to the PIC's main plain, and/or introducing at suitable locations within assembly 500 metallic or dielectric reflective interfaces, refractive elements, such as prisms, and/or diffractive elements such as gratings.

FIG. 6 shows a fiber-to-PIC connector arrangement 600 that can be used in device 200 (FIG. 2) according to another embodiment. As shown, connector arrangement 600 comprises an array 501 of MCFs 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

Connector element 250 includes an array of 3D waveguides 652, formed in (e.g., optically written in) a suitable host material such as glass using a suitable technology, such as some of the products offered for sale by Optoscribe of Livingston, United Kingdom.

In some embodiments, 3D waveguides 652 written into connector element 250 may expand or suitably geometrically re-arrange the array geometry of spatial paths provided by fibers 202 at fiber end face plane 243. In the embodiment shown in FIG. 6, 3D waveguides expand the mode field diameter by a factor of $C_2=2$ between fiber end face plane 243 and connector mating plane 241.

In some embodiments, 3D waveguides 652 of connector element 250 may independently expand the mode field diameter of individual waveguides to enable an expanded-beam connection at connector mating plane 241. This may be accomplished by using taper or inverse-taper structures within 3D waveguide arrangement 652 and/or by changing one or more 3D waveguide writing parameters, such as scan speed or repetition rate of the femtosecond laser pulses used to write 3D waveguides 652, resulting in larger 3D waveguide mode field diameters.

In some embodiments, 3D waveguides 652 in connector element 250 may also introduce bend angles, e.g., to accommodate different angles of incidence of light from fibers 202, e.g., from a fiber end face plane that is not parallel to the PIC's main surface. In some embodiments, 3D-waveguide bends may be combined with reflective or refractive angle changes due to suitably placed dielectric or metallic interfaces (not explicitly shown in FIG. 6), or diffractive angle changes from suitably placed gratings (not explicitly shown in FIG. 6).

Connector element 240 may use 3D waveguides 644 some of whose mode field diameters relative to a typical fiber mode field diameter within fiber end face plane 243 are expanded at connector mating pane 241 to essentially match the mode field diameter of the corresponding waveguides of connector element 250 at connector mating plane 241.

In some embodiments, 3D waveguides 644 of connector element 240 may suitably change array size, array geometry, mode size, and incidence angles to match the respective geometric parameters at coupling plane 242.

In the example embodiment shown in FIG. 6, each waveguide mode field diameter is reduced from a magnification of $C_2=2$ at connector mating plane 241 to 75% thereof, thereby yielding an overall mode field diameter magnification from fibers 202 in fiber end face plane 243 to vertical coupler array 230 in coupling plane 242 of $C_1=2\times 0.75=1.5$. The larger effective mode size in coupling plane 242 compared to fiber end face plane 243 may advantageously help to relax the positioning tolerances of connector element 240 relative to the array 230 of vertical-coupling elements 231 in coupling plane 242.

In some embodiments, some or all waveguide bends 645 may establish a desired coupling angle to vertical-coupling elements 231 of array 230.

The 3D waveguide system described above should only be viewed as one of many possible embodiments that can be used to perform independent array pattern scaling, array pattern geometry transformation, spot size scaling, and angle-of-incidence adaptation. Hybrid assemblies are also possible in some embodiments and may be considered as functional equivalents of the above-described embodiments. Some embodiments may use any suitable combination of diffractive, reflective, or refractive surfaces, 3D waveguides, and 3D-printed structures within either or both of connector elements 240 and 250.

Some embodiments may be constructed to use polarization diversity optics within connector assemblies 271 and 272. For example, some cores of the one or more fibers 202 may carry signals of random polarization or may carry polarization-multiplexed signals. In addition, some vertical grating couplers may be polarization sensitive. Properly coupling dual-polarization light from one or more fibers 202 to a PIC 210 may thus benefit from polarization-diversity vertical-coupling elements, such as two-dimensional polarization-diversity vertical grating couplers. Some polarization-diversity vertical-coupling elements may have an inherently higher insertion loss compared to that of single-polarization vertical-coupling elements. Hence, replacing one polarization-diversity vertical-coupling element by a pair of single-polarization vertical-coupling elements and performing polarization-diversity outside the PIC, e.g., within connector assembly 271 and 272, may be beneficial.

Some embodiments may benefit from the use of polarization diversity optics disclosed, e.g., in U.S. Pat. No. 9,927,575, which is incorporated herein by reference in its entirety.

FIG. 7 shows a fiber-to-PIC connector arrangement 700 that can be used in device 200 (FIG. 2) according to yet another embodiment. As shown, connector arrangement 700 comprises an array 501 of MCFs 202 connected to connector element 250. The end faces of the MCFs 202 are arranged to be substantially in the same plane, i.e., fiber end face plane 243 (also see FIG. 2). Connector element 250 is further connected to connector element 240, and the interface between the two connector elements includes connector mating plane 241 (also see FIG. 2).

The embodiment shown in FIG. 7 is constructed to couple M=8 spatial paths of fibers 202 in fiber end face plane 243 to N=16>M vertical-coupling elements 231 of array 230.

Connector element 250 includes one collimating lens 551 per MCF 202. In an example embodiment, collimating lenses 551 may be arranged to provide enlarged light-beam-spot sizes in connector mating plane 241. Connector element 250 further includes a polarization-diversity assembly 757.

Figure 8A:
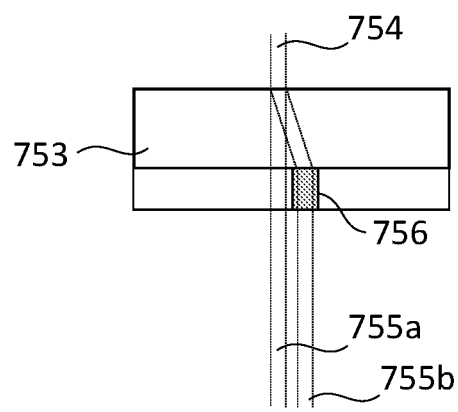
FIGS. 8A and 8B show schematic cross-sectional side views of a part of a fiber-to-PIC connector arrangement that can be used in the integrated optical device of FIG. 7 according to some embodiments.

FIG. 8A shows the schematic side-view 810 of a sub-element of polarization-diversity assembly 757 according to an embodiment. As shown, assembly 757 comprises a birefringent beam displacement element 753. In some embodiments, element 753 can be made of such birefringent materials as properly oriented calcite, YVO4, or a-BBO, such as those offered for sale by MT-Optics of Fuzhou, Fujian, China. Birefringent beam displacement element 753 operates to split an incoming beam 754 into a corresponding pair of outgoing beams 755a and 755b. As such, beams 755a and 755b contain respective light of two orthogonal polarization states of incoming beam 754. To prepare beams 755a and 755b for coupling to parallel-aligned (as opposed to orthogonally-oriented) vertical grating couplers in array 230, beam 755b is passed through a half-wave plate 756 to rotate the polarization of light therein. Past half-wave plate 756, beams 755a and 755b have the same polarization state and, as such, are properly conditioned to use parallel-oriented vertical grating couplers in array 230.

In an alternative embodiment, beam 755a (instead of beam 755b) may be passed through half-wave plate 756 to rotate the polarization of light therein. In various embodiments, half-wave plate 756 may be made, e.g., from quartz crystals, polymer retarder film, or may be 3D printed. In some embodiments, polarization-diversity structure 757 may be manufactured using wafer-scale optical processing and assembly.

In some embodiments, polarization-diversity structure 757 may be inserted at other places within connector elements 240 or 250 in fiber-to-PIC array connector arrangement 700, e.g., between lenses 741 and lenses 742 or between lenses 751 and lenses 741.

In some embodiments, some elements of polarization-diversity structure 757 may be functionally split and placed at different locations within connector elements 271 and 272. For example, birefringent beam displacement element 753 may be placed between fiber end face plane 243 and lenses 751, and half-wave plates 756 may be placed between lenses 741 and lenses 742.

Figure 8B:
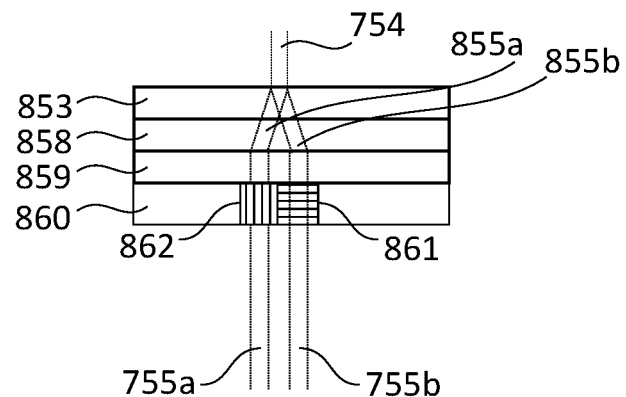

FIG. 8B shows the schematic side-view 820 of a sub-element of polarization-diversity assembly 757 according to an alternative embodiment. This particular embodiment uses a polarization-sensitive grating 853, such as offered for sale by ImagineOptix of Durham, N.C., USA, that operates to split incident light beam 754 into two circularly polarized beams 855a and 855b whose polarizations are mutually orthogonal. Beams 855a and 855b are directed through an optical layer 858 that has a sufficient thickness to have the beams sufficiently laterally separated. A second polarization grating 859 then operates to diffract the laterally separated beams 855a and 855b such that the beams so diffracted become parallel to the original light beam 754. A subsequent optical layer 860 comprising a quarter-wave polarization retarder element 861 and a three-quarter-wave polarization retarder element 862 then converts the polarizations of both beams 855a and 855b to the same linear polarization state. In an example embodiment, this linear polarization state is a proper polarization state for achieving efficient optical coupling of the linearly polarized beams 755a and 755b into vertical grating couplers of array 230.

It should be appreciated by those of ordinary skill in the pertinent art that at least some embodiments described herein in the context of coupling light from one or more fibers 202 to PIC 210 can be equally operable to couple light from PIC 210 to one or more fibers 202. This reversibility of the coupling direction is a general feature of at least some embodiments described herein, including some of those using polarization diversity.

Example optical systems disclosed herein should only be viewed as some of many possible embodiments that can be used to perform polarization demultiplexing and independent array pattern scaling, array geometry re-arrangement, spot size scaling, and angle-of-incidence adaptation using diffractive, refractive, reflective, and polarization-dependent optical elements, 3D waveguides and 3D printed optical components. Other implementations achieving a similar set of functionalities can be made and used by persons of ordinary skill in the pertinent art, in view of this disclosure and without any undue experimentation.

According to an example embodiment disclosed above, e.g., in the summary section and/or in reference to any one or any combination of some or all of FIGS. 1-8, provided is an apparatus comprising: one or more optical fibers (e.g., 202, FIG. 5) having a plurality of fiber cores (e.g., 302, FIGS. 3A-3G); a photonic integrated circuit (e.g., 210, FIG. 5) including a plurality (e.g., 230, FIG. 5) of vertical-coupling elements (e.g., 231, FIG. 5) disposed along a main surface of the photonic integrated circuit; and a fiber-optic connector (e.g., 240/250, FIG. 5) connected between the one or more optical fibers and the photonic integrated circuit to communicate light therebetween through the main surface, the fiber-optic connector comprising optics configured to transfer light between the plurality of fiber cores and the plurality of vertical-coupling elements such that: a distance (e.g., $S_{min}$, FIGS. 3A-3G) between a first pair of the fiber cores is optically scaled by a first scaling factor (e.g., A); and a diameter (e.g., $D_{core}$, FIGS. 3A-3G) of at least one of the fiber cores is optically scaled by a second scaling factor (e.g., $C_1$) that is different from the first scaling factor.

In some embodiments of the above apparatus, the optics is further configured to transfer the light such that a distance (e.g., Sm, FIGS. 3A-3G) between a second pair of the fiber cores is optically scaled by a third scaling factor (e.g., B) that is different from the second scaling factor.

In some embodiments of any of the above apparatus, the optics is configured to transfer the light such that the third scaling factor is different from the first scaling factor.

In some embodiments of any of the above apparatus, the optics is configured to transfer the light such that the first scaling factor is substantially equal to the third scaling factor.

In some embodiments of any of the above apparatus, the optics comprises: one or more first lenses (e.g., 551, FIG. 5) located at a first offset distance from the main surface; a plurality of second lenses (e.g., 541, FIG. 5) located at a second offset distance from the main surface, the second offset distance being smaller than the first offset distance; and a plurality of third lenses (e.g., 542, FIG. 5) located at a third offset distance from the main surface, the third offset distance being smaller than the second offset distance.

In some embodiments of any of the above apparatus, the optics comprises at least one lens (e.g., 542, FIG. 5) configured to communicate light with a single one of the fiber cores and a single one of the vertical-coupling elements.

In some embodiments of any of the above apparatus, the optics comprises a plurality of optical waveguides (e.g., 652, FIG. 6), each optically connecting a respective one of the fiber cores and a respective one of the vertical-coupling elements.

In some embodiments of any of the above apparatus, at least some of the optical waveguides are tapered.

In some embodiments of any of the above apparatus, the optics comprises one or more polarization beam splitters (e.g., 810 and 820, FIG. 8A and FIG. 8B).

In some embodiments of any of the above apparatus, the optics comprises one or more polarization-rotating elements (e.g., 861, 862, FIG. 8B).

In some embodiments of any of the above apparatus, the fiber-optic connector comprises a first connector part (e.g., 250, FIG. 5) and a second connector part (e.g., 240, FIG. 5) disconnectably connected to one another.

In some embodiments of any of the above apparatus, the optics is configured to produce, at a mating surface between the first and second connector parts, light spots (e.g., 560, FIG. 5) of a larger size, by at least a factor of two, than corresponding diameters of the fiber cores.

In some embodiments of any of the above apparatus, the optics is configured to communicate light between a first number of the fiber cores and a second number of the vertical-coupling elements, the second number being greater than the first number.

In some embodiments of any of the above apparatus, the one or more optical fibers include a multi-core optical fiber.

In some embodiments of any of the above apparatus, each of the vertical-coupling elements is selected from an element set consisting of: a single-polarization vertical grating coupler, a turning mirror, a polarization-diversity vertical grating coupler, a vertical cavity surface emitting laser, a surface-normal modulator, and a photodiode.

According to another example embodiment disclosed above, e.g., in the summary section and/or in reference to any one or any combination of some or all of FIGS. 1-8, provided is a fiber-optic connector comprising: a first connector part (e.g., 240, FIG. 5) connectable at a first side thereof (e.g., 555, FIG. 5) to one or more optical fibers (e.g., 202, FIG. 5) having a plurality of fiber cores (e.g., 302, FIGS. 3A-3G), the first connector part having a second side that is opposite to the first side (e.g., 556, FIG. 5); a second connector part (e.g., 250, FIG. 5) connectable at one side thereof (e.g., 545, FIG. 5) to the second side of the first connector part and further connectable at an opposite side thereof (e.g., 546, FIG. 5) to a photonic integrated circuit (e.g., 210, FIG. 2); and optics configured to transfer light between the first side of the first connector part and the opposite side of the second connector part such that: a distance (e.g., $S_{min}$, FIGS. 3A-3G) between a first pair of the fiber cores is optically scaled by a first scaling factor (e.g., A); and a diameter (e.g., $D_{core}$, FIGS. 3A-3G) of at least one of the fiber cores is optically scaled by a second scaling factor (e.g., $C_1$) that is different from the first scaling factor.

As used herein, the term "opposite" refers to a relative orientation and/or position of two corresponding sides or edges of the part and should be construed to cover any of the relative orientations/positions in which: (i) such two sides are substantially (e.g., to within 15 degrees) parallel to one another but located at different ends of the part; (ii) such two sides are not parallel to one another, i.e., may be oriented at a relative angle in the range between 15 degrees and 165 degrees; (iii) such two sides are substantially perpendicular to one another; (iv) at least one of such two sides is not strictly planar and has some features deviating from the planar geometry; (v) such two sides have no point of contact with one another; and (vi) such two sides have a common edge or area of contact, e.g., at the corner of the part. The sides 545, 546, 555, and 556 shown in FIG. 5 should be viewed as providing non-limiting illustrative examples of such sides.

In some embodiments of the above fiber-optic connector, the optics is further configured to transfer the light such that a distance (e.g., $S_{max}$, FIGS. 3A-3G) between a second pair of the fiber cores is optically scaled by a third scaling factor (e.g., B) that is different from the second scaling factor.

In some embodiments of any of the above fiber-optic connectors, the optics is configured to transfer the light such that the third scaling factor is different from the first scaling factor.

In some embodiments of any of the above fiber-optic connectors, the optics is configured to transfer the light such that the first scaling factor is substantially equal to the third scaling factor.

In some embodiments of any of the above fiber-optic connectors, the optics comprises: one or more first lenses (e.g., 551, FIG. 5) located at a first offset distance from the opposite side of the second connector part; a plurality of second lenses (e.g., 541, FIG. 5) located at a second offset distance from the opposite side of the second connector part, the second offset distance being smaller than the first offset distance; and a plurality of third lenses (e.g., 542, FIG. 5) located at a third offset distance from the opposite side of the second connector part, the third offset distance being smaller than the second offset distance, said first, second, and third distances being measured with the first and second connector parts being connected to one another.

In some embodiments of any of the above fiber-optic connectors, the optics comprises at least one lens (e.g., 542, FIG. 5) configured to communicate light with a single one of the fiber cores and a single one of vertical-coupling elements of the photonic integrated circuit.

In some embodiments of any of the above fiber-optic connectors, the optics comprises a plurality of optical waveguides (e.g., 652, FIG. 6), each disposed to optically connect a respective one of the fiber cores and a respective one of vertical-coupling elements of the photonic integrated circuit.

In some embodiments of any of the above fiber-optic connectors, at least some of the optical waveguides are tapered.

In some embodiments of any of the above fiber-optic connectors, the optics comprises one or more polarization beam splitters (e.g., 810 and 820, FIG. 8A and FIG. 8B).

In some embodiments of any of the above fiber-optic connectors, the optics comprises one or more polarization-rotating elements (e.g., 861, 862, FIG. 8B).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising:
    one or more optical fibers having a plurality of fiber cores, in which each optical fiber includes at least one fiber core;
    a photonic integrated circuit including a plurality of vertical-coupling elements disposed along a main surface of the photonic integrated circuit; and
    a fiber-optic connector connected between the one or more optical fibers and the photonic integrated circuit to communicate light therebetween through the main surface, the fiber-optic connector comprising optics configured to transfer light between the plurality of fiber cores and the plurality of vertical-coupling elements such that:
        a minimum core-to-core spacing of the fiber cores is different from a minimum spacing between the vertical coupling elements along the main surface of the photonic integrated circuit;
    wherein the fiber-optic connector comprises one or more polarization beam splitters, and one or more polarization-rotating elements;
    wherein each of at least some of the one or more polarization beam splitters is configured to split an incident light beam from a corresponding fiber core into a first beam having a first polarization and a second beam having a second polarization different from the first polarization, in which the optics is configured to transmit the first beam having the first polarization to a corresponding first vertical-coupling element, a corresponding polarization-rotating element is configured to rotate the polarization of the second beam to cause the second beam to also have the first polarization, and the optics is further configured to transmit the second beam having the first polarization to a corresponding second vertical-coupling element.

2. The apparatus of claim 1 in which the number of fiber cores is different from the number of vertical-coupling elements.

3. The apparatus of claim 2 in which the number of vertical-coupling elements is twice the number of fiber cores.

4. The apparatus of claim 1 in which each vertical-coupling element comprises a vertical grating coupler.

5. The apparatus of claim 1, wherein the fiber-optic connector comprises a first connector element and a second connector element, the first connector element is coupled to the one or more optical fibers, the second connector element is coupled to the photonic integrated circuit, and the one or more polarization beam splitters are positioned in the first connector element.

6. The apparatus of claim 1, wherein the fiber-optic connector comprises a first connector element and a second connector element, the first connector element is coupled to the one or more optical fibers, the second connector element is coupled to the photonic integrated circuit, and the one or more polarization beam splitters are positioned in the second connector element.

7. The apparatus of claim 1, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, and the one or more polarization beam splitters are positioned between the first set of lenses and the second set of lenses.

8. The apparatus of claim 1, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, and the one or more polarization beam splitters are positioned between the second set of lenses and the third set of lenses.

9. The apparatus of claim 1, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, wherein the one or more polarization beam splitters are positioned between a fiber end face plane and the first set of lenses, and the one or more polarization-rotating elements are positioned between the first set of lenses and the second set of lenses.

10. The apparatus of claim 1, wherein the polarization beam splitter comprises a first polarization-sensitive grating that is configured to split the incident light beam into the first beam and the second beam, the first beam has a first circular polarization, and the second beam has a second circular polarization that is different from the first circular polarization.

11. The apparatus of claim 10, wherein the optics comprises a second polarization-sensitive grating that is configured to diffract the first beam and the second beam such that the first and second beams so diffracted become parallel to the incident light beam.

12. The apparatus of claim 11, wherein the optics comprises a quarter-wave polarization retarder element and a three-quarter-wave polarization retarder element that are configured to convert the first and second beams to have a same linear polarization state.

13. The apparatus of claim 1, wherein the first polarization is substantially orthogonal to the second polarization.

14. An apparatus comprising:
a photonic integrated circuit comprising a two-dimensional arrangement of parallel aligned polarization-sensitive vertical grating couplers disposed along a main surface of the photonic integrated circuit;
a two-dimensional arrangement of optical fiber cores; and
a fiber-optic connector configured to process light beams transmitted between the two-dimensional arrangement of optical fiber cores and the two-dimensional arrangement of parallel aligned polarization-sensitive vertical grating couplers;
wherein the fiber-optic connector comprises one or more polarization beam splitters, and one or more polarization-rotating elements;
wherein each polarization beam splitter is configured to split an incident light beam from a corresponding optical fiber core into a first beam having a first polarization and a second beam having a second polarization different from the first polarization, in which the fiber-optic connector comprises optics configured to transmit the first beam having the first polarization to a corresponding first polarization-sensitive vertical grating coupler, a corresponding polarization-rotating element is configured to rotate the polarization of the second beam to cause the second beam to also have the first polarization, and the optics is further configured to transmit the second beam having the first polarization to a corresponding second polarization-sensitive vertical grating coupler.

15. The apparatus of claim 14 in which a minimum core-to-core spacing of the optical fiber cores is different from a minimum spacing between the polarization-sensitive vertical grating couplers along the main surface of the photonic integrated circuit.

16. An apparatus comprising:
one or more optical fibers having a plurality of fiber cores;
a photonic integrated circuit including a plurality of vertical-coupling elements disposed along a main surface of the photonic integrated circuit; and
a fiber-optic connector connected between the one or more optical fibers and the photonic integrated circuit to communicate light therebetween through the main surface, the fiber-optic connector comprising optics configured to transfer light between the plurality of fiber cores and the plurality of vertical-coupling elements;
wherein the optics comprises one or more polarization beam splitters, and one or more polarization-rotating elements;
wherein each polarization beam splitter is configured to split an incident light beam from a corresponding fiber core into a first beam having a first polarization and a second beam having a second polarization different from the first polarization;
wherein the optics is configured to transmit the first beam having the first polarization to a corresponding first vertical-coupling element, a corresponding polarization-rotating element is configured to rotate the polarization of the second beam to cause the second beam to also have the first polarization, and the optics is further configured to transmit the second beam having the first polarization to a corresponding second vertical-coupling element;
wherein a minimum core-to-core spacing of the fiber cores is different from a minimum spacing between the vertical grating couplers along the main surface of the photonic integrated circuit.

17. The apparatus of claim 16, wherein the first polarization comprises a first linear polarization, the second polarization comprises a second linear polarization that is orthogonal to the first polarization.

18. The apparatus of claim 16, wherein the first vertical-coupling element and the second vertical-coupling element comprise two parallel aligned vertical grating couplers.

19. The apparatus of claim 16, wherein all of the vertical-coupling elements comprise parallel aligned vertical grating couplers.

20. The apparatus of claim 16, wherein the polarization beam splitter comprises a birefringent beam displacement element that separates the incident light beam into the first beam and the second beam, and also displaces the second beam relative to the first beam by a specified distance.

21. The apparatus of claim 16, wherein the one or more polarization-rotating elements are configured to impose a first polarization rotation on approximately a first half of the light beams passing therethrough and to impose a second polarization rotation on approximately a second half of the light beams different from the approximately first half of the light beams passing therethrough such that after passing the one or more polarization-rotating elements all of the light beams have substantially a same polarization state.

22. The apparatus of claim 16, wherein the polarization-rotating element comprises a half-wave plate.

23. The apparatus of claim 16, wherein the fiber-optic connector comprises a first connector element and a second connector element, the first connector element is coupled to the one or more optical fibers, the second connector element is coupled to the photonic integrated circuit, and the one or more polarization beam splitters are positioned in the first connector element.

24. The apparatus of claim 16, wherein the fiber-optic connector comprises a first connector element and a second connector element, the first connector element is coupled to the one or more optical fibers, the second connector element is coupled to the photonic integrated circuit, and the one or more polarization beam splitters are positioned in the second connector element.

25. The apparatus of claim 16, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, and the one or more polarization beam splitters are positioned between the first set of lenses and the second set of lenses.

26. The apparatus of claim 16, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, and the one or more polarization beam splitters are positioned between the second set of lenses and the third set of lenses.

27. The apparatus of claim 16, wherein the fiber-optic connector comprises a first connector element and a second connector element, the first connector element is coupled to the one or more optical fibers, the second connector element is coupled to the photonic integrated circuit, the first connector element comprises a first set of lenses to focus light beams from the plurality of fiber cores, the second connector element comprises a second set of lenses to collimate the light beams and a third set of lenses to focus the collimated light beams onto the vertical-coupling elements, wherein the one or more polarization beam splitters are positioned between a fiber end face plane and the first set of lenses, and the one or more polarization-rotating elements are positioned between the first set of lenses and the second set of lenses.

28. The apparatus of claim 16, wherein the polarization beam splitter comprises a first polarization-sensitive grating that is configured to split the incident light beam into the first beam and the second beam, the first beam has a first circular polarization, and the second beam has a second circular polarization that is different from the first circular polarization.

29. The apparatus of claim 28, wherein the optics comprises a second polarization-sensitive grating that is configured to diffract the first beam and the second beam such that the first and second beams so diffracted become parallel to the incident light beam.

30. The apparatus of claim 29, wherein the optics comprises a quarter-wave polarization retarder element and a three-quarter-wave polarization retarder element that are configured to convert the first and second beams to have a same linear polarization state.

* * * * *